May 22, 1923.

G. RICHARDS

MILLING SCREW THREADS

Filed Feb. 5, 1917

1,456,280

2 Sheets-Sheet 1

Inventor.
George Richards

May 22, 1923.

G. RICHARDS

MILLING SCREW THREADS

Filed Feb. 5, 1917

1,456,280

2 Sheets-Sheet 2

Inventor.
George Richards
per G.H.Hardingham
Attorney

Patented May 22, 1923.

1,456,280

UNITED STATES PATENT OFFICE.

GEORGE RICHARDS, OF LONDON, ENGLAND.

MILLING SCREW THREADS.

Application filed February 5, 1917. Serial No. 146,692.

(GRANTED UNDER THE PROVISIONS OF THE ACT OF MARCH 3, 1921, 41 STAT. L., 1313.)

*To all whom it may concern:*

Be it known that I, GEORGE RICHARDS, a citizen of the United States of America, and resident of London, England, engineer, have invented certain new and useful Improvements in Milling Screw Threads (for which I have filed an application in Great Britain Oct. 15, 1915, #14.571), of which the following is a specification.

This invention relates to an improved method of milling screw-threads on the external surface of either cylindrical or conical bodies, and to the construction of machines adapted for use in carrying such method into practice.

When what are known as "hobs" are used to mill screw-threads on the external surface of a cylindrical body by working the cutting edges of the former in a direction opposite to that in which the surface of the latter rotates, the result is to form a number of facets upon the surface of the work. With a view to avoiding this effect, I cause the hob, although nominally running at the same rotative speed as the work, to partake of a slight creep in advance, or a slight creep in arrear, relatively to the work. By these means, every part of the surface of the work is brought into contact with the teeth of the hob at the same radial distance, with the result that the threads, after milling, present a smooth surface.

Figure 1:
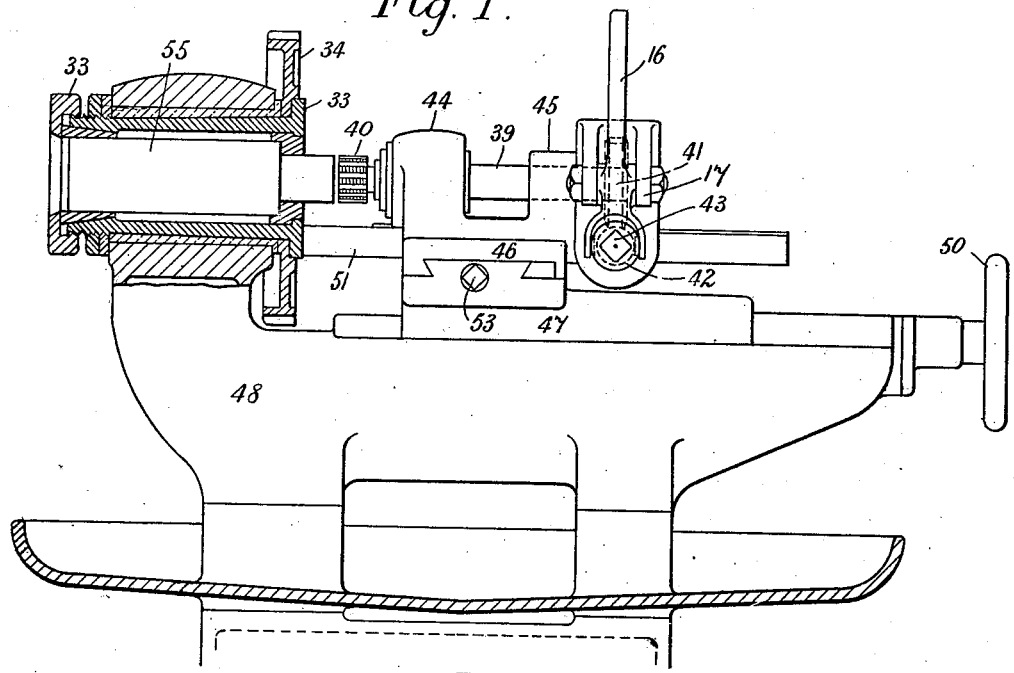
Figure 2:
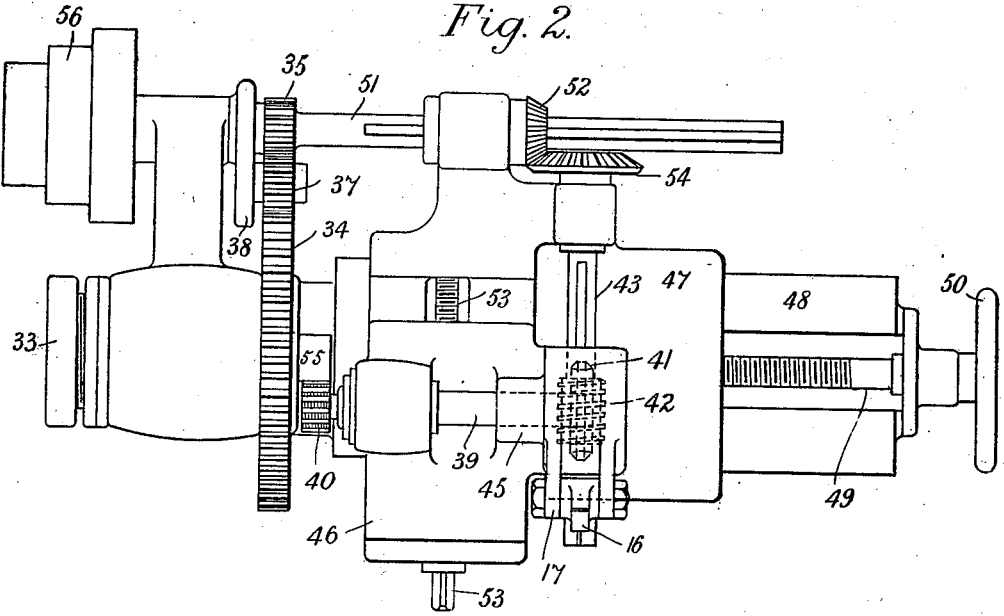
Figure 3:
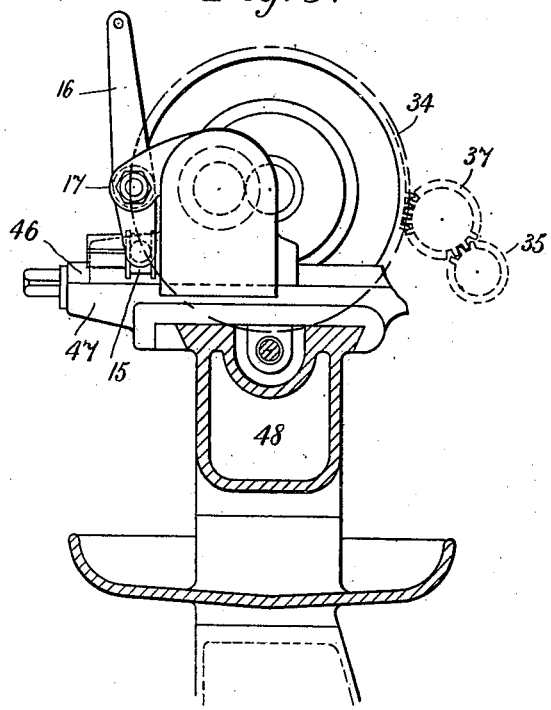
Figure 4:
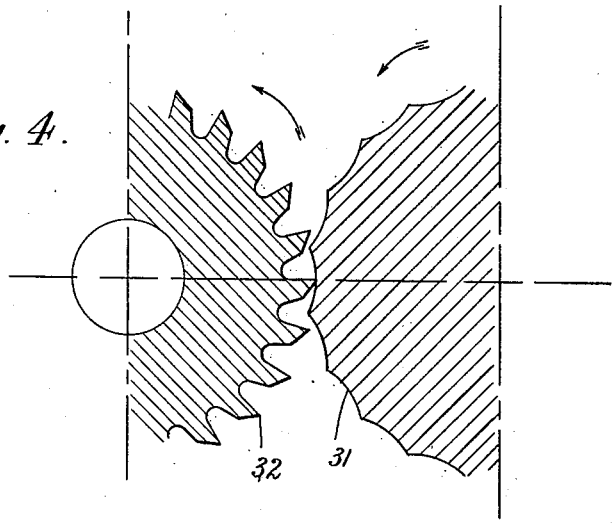

A machine adapted for use in carrying my improved method of milling into effect is illustrated in the accompanying drawings, whereof Fig. 1 is a side elevation, Fig. 2 a plan and Fig. 3 an end view partly in section. Fig. 4 is a diagram illustrating the ordinary effect of a milling cutter upon a piece of work running at the same rotative speed, and Fig. 5 is an enlarged view of a combined hob and milling cutter and of the work produced, hereinafter more particularly referred to.

Referring to Figs. 1, 2 and 3, the hollow spindle 33 is driven by the gear 34; and this gear receives motion from the shaft 51 through the gear-wheel 35 and intermediate wheel 37, the latter being mounted in an arm or swing-plate 38. The shaft 51 is driven at various speeds by means of the cone-pulley 56. The arbour 39, which carries the hob or milling cutter 40, is driven by the worm-wheel 41 and the worm 42, which latter slides on the shaft 43. The arbour 39 is mounted in the carriage 47. This carriage has a longitudinal movement on the bed 48, being actuated by the screw 49 and the wheel 50. The driving shaft 51, on which the bevel-pinion 52 is arranged to slide on a spline, drives the bevel-wheel 54; and this in its turn operates the shaft 43 which passes through the worm 42. The screw 53 moves the cross-slide 46 into position to enable the hob 40 to operate to cut the thread. The spur-gears 35, 37 and 34, whereby the hollow spindle 33 and piece of work 55 are driven, are so designed in relation to the bevel and worm-gears 52, 54, 42, 41, whereby the hob or milling cutter 40 is driven, that the same rotative speed is normally imparted to the work and to the hub. This equality of rotative speed is, however, capable of slight variation in the following manner: The worm 42 is formed with a tubular extension 15 provided with collars between which the forked end of a lever 16 works, the latter being mounted on a fixed pivot 17. Upon the lever 16 being vibrated, the worm 42 is moved axially upon the shaft 43 with the effect that the rotative speed of the hob 40, transmitted through the said worm, is slightly increased or slightly decreased. The effect of this will be readily perceived on reference to the diagram Fig. 4. Instead of the teeth 32 of the cutter reaching the facet 31 on the work as represented on the centre line, it will reach the facet at a point slightly in advance or slightly in arrear of that point, with the ultimate result that the formation of facets upon the surface of the work will be prevented. The total to or fro movement of the worm 42 should be such as to accelerate or retard the rotative speed of the hob by about one tooth-space.

Figure 5:
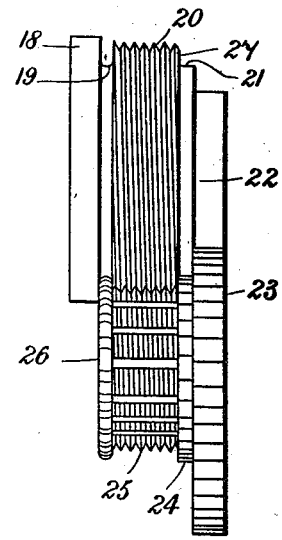

In Fig. 5 is shown a piece of work in which is to be formed a screw-thread 20, a circular chase 19 and a face recess 27. The hob carries milling cutters of the usual form 23, 24, 26. In carrying out these operations, the hob 25 and the milling cutters 23, 24, 26, mill the thread 20 and complete the surfaces 19, 21, 22 and 27; it being borne in mind that no end-on movement of the hob relatively to the work 18 is taking place for the purpose of milling the screw-thread 20.

I claim as my invention:—

1. In a machine for cutting screw-threads by means of a hob, a shaft for rotating the hob, a shaft for rotating the work, mechanism interconnecting the two shafts for rotating the hob and the work normally at the same rotative speed, and means, forming a part of said mechanism, for slightly varying at will and within narrow limits the relative rotative speeds of two shafts.

2. In a machine for cutting screw-threads by means of a hob, a shaft for rotating the hob, a shaft for rotating the work, means for moving one shaft towards the other shaft, mechanism interconnecting the two shafts and adapted to rotate the hob and the work normally at the same rotative speed, said mechanism including an intermediate spindle and a worm mounted to slide thereon, the intermediate spindle engaging one of the said shafts, and means for imparting axial movement to the worm in relation to its spindle.

3. In a machine for cutting screw-threads by means of a hob and wherein the hob is driven through a worm gear, means for imparting to the worm a limited axial movement, whereby the rotative speed of the hob in relation to that of the work is slightly increased or diminished.

4. In a machine for cutting screw-threads by means of a hob, the combination, with driving mechanism interconnecting the shaft for rotating the hob and the shaft for rotating the work at nominally the same rotative speed, of a worm, mounted to slide longitudinally on a feathered shaft and formed with a collared sleeve, and a pivoted lever in engagement with the sleeve collars, substantially as and for the purpose set forth.

GEORGE RICHARDS.